A55-4 81 233 5X
2,571,137

Loss-4

5189

[redacted]

Oct. 16, 1951 W. HOTINE 2,571,137

RADIO FREQUENCY DISTRIBUTION SYSTEM

Filed Dec. 30, 1948 2 Sheets-Sheet 1

INVENTOR
William Hotine
BY John C. Mitchell
ATTORNEY

Oct. 16, 1951 W. HOTINE 2,571,137

RADIO FREQUENCY DISTRIBUTION SYSTEM

Filed Dec. 30, 1948 2 Sheets-Sheet 2

INVENTOR
William Hotine
BY
ATTORNEY

SEARCH RO

Patented Oct. 16, 1951 2,571,137

UNITED STATES PATENT OFFICE 2,571,137

RADIO-FREQUENCY DISTRIBUTION SYSTEM

William Hotine, Great Neck, N. Y., assignor to Radio Corporation of America, a corporation of Delaware Application December 30, 1948, Serial No. 68,287

17 Claims. (Cl. 250—9)

The present invention relates to a radio frequency signal distribution system especially adapted for use in architectural buildings such as houses, apartment houses, hotels, and the like, and deals more directly, although not necessarily limited thereto, with a system wherein a plurality of radio frequency signals of different frequencies may be intercepted by a plurality of receiving instrumentalities and distributed to various locations within a building.

More particularly the present invention concerns itself with an improved television antenna distribution system for apartment houses or buildings wherein several television channels may be independently received and carried by a common medium to various locations within the building at which locations they are in turn made available for use by standard equipment designed for such purposes.

As the television art progresses, the problem of providing practical and economical antenna distribution systems for apartment houses or any dwelling wherein a plurality of separate television receivers are to be independently operated, becomes of increasing importance. At the present stage of the art, it is impractical for the owner of a television receiver to construct a suitable antenna in the room in which the receiver is to be operated. It is found in general that the shielding effects of the building structure produces an undesirable and in most cases, intolerable attenuating effect on the received signal, thus rendering the picture quality quite poor. This, of course, has led to the construction, on the roof of the building, of a separate antenna for each television receiver, which may in itself become impractical if a large number of receivers are to be operated in a given building.

On the other hand if a plurality of receivers are coupled in an ordinary fashion to a single antenna, it has been found that the receivers interact causing annoying disturbances or deficiencies in reception. Accordingly, numerous systems have been devised for operating a plurality of receivers from a very few antennae and in some instances a single antenna but such systems usually employ elaborate co-axial cable distribution networks to distribute the received energy as well as individual isolating amplifiers for each receiver in order to avoid interaction. In such distribution systems, the cost of installation is not only relatively high but unless great care is exercised, in its installation, the attenuation of the distribution system will be sufficient to greatly reduce the system signal to noise ratio and thereby produce a marked drop in picture quality.

The present invention overcomes to a large extent some of the above disadvantages common to known antenna distribution systems by utilizing the ventilating or air distribution ducts of architectural structures as a waveguide for a high frequency carrier. Thus, the incoming television or other frequency intelligence signals are transduced into super high frequency radio signals suitable for waveguide propagation in the ventilating system ducts. This transformation in frequency is accomplished by mixing the one or more incoming signals with a super high frequency local oscillator having itself a frequency above the cut-off frequency of the air duct system. A plurality of probes may then be inserted in the duct systems at various locations throughout the building for detection of the super high frequency signals propagated by the ducts. By passing the super high frequency propagated signals thus detected through a simple and inexpensive non-linear device there is developed, by heterodyne action, the original received high frequency intelligence signals at their original frequency so that any number of conventional television receivers or radio signal utilization means may be operated independently of one another throughout the building.

It is therefore an object of the present invention to provide a simple and novel radio frequency distribution system for architectural buildings or dwellings.

It is further an object of the present invention to provide an improved novel and economical radio frequency signal distribution suitable for television frequencies and finding particular application in apartment houses, hotels, or the like having a system of metallic tubes or ducts communicating from one location to the other therein.

It is another purpose of the present invention to provide a simple and economical antenna distribution system for television receivers wherein a plurality of receivers may be independently operated from one or more common antennae in such a way as to prevent any deleterious influence of one receiver upon another.

It is still further a purpose of the present invention to provide an intelligence signal distribution system for television systems or the like which finds particular utility in buildings having metallic air distribution ducts, the system being basically simple in operation and requiring a minimum of terminal equipment for each receiver operating from the system.

Other objects as well as advantages of the present invention will be apparent as the description thereof proceeds and the invention itself will be best understood both as to its mode of operation and the possible ways of practicing the same by reference to this specification taken in connection with the accompanying drawings wherein.

Figure 1:
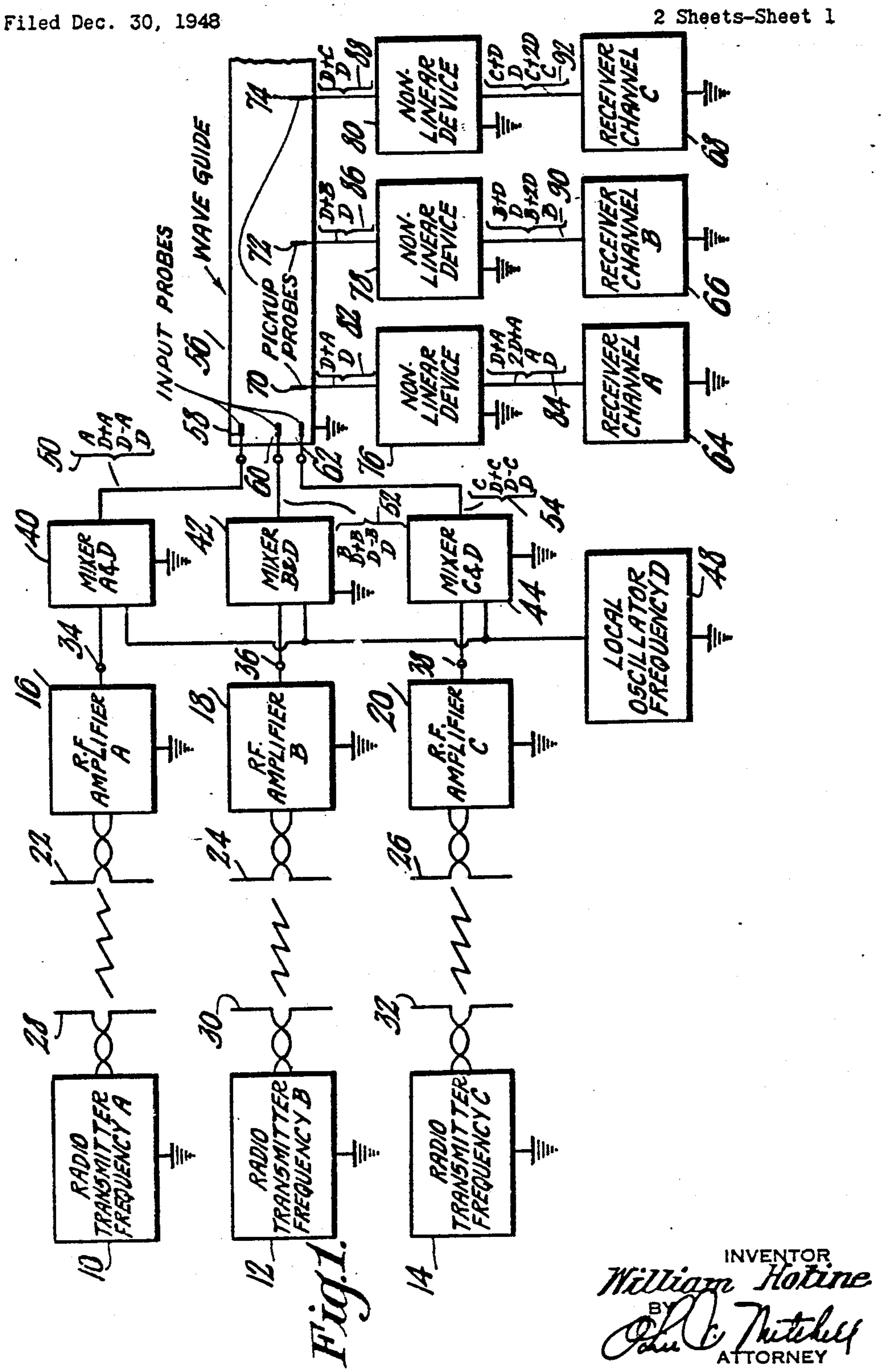
Figure 1 is a simple block diagram illustrating one form of the present invention.

Referring now to Figure 1, there is illustrated three radio transmitters 10, 12, and 14 respectively operated on carrier frequencies A, B, C. These transmitters may be considered as being situated and operated at a plurality of remote locations. Locally situated, however, are respective radio frequency amplifiers 16, 18, and 20 with their related antennae 22, 24, and 26 adapted to intercept and amplify the signal frequencies A, B, and C transmitted by the respective antennae 28, 30, and 32 of the transmitters 10, 12, and 14. Therefore, there will appear at the respective output terminals 34, 36, and 38 of the RF amplifiers an amplified version of the transmitted signals at the respective frequencies of transmission.

The output of the amplifiers 16, 18, and 20 are then fed to respective non-linear mixer circuits represented by blocks 40, 42, and 44. There is locally generated a super high frequency signal having a substantially constant frequency D as indicated in block 48. The output of the local oscillator is also fed into the individual mixers 40, 42, and 44 for non-linear mixing with the frequencies A, B, and C communicated by the amplifiers 16, 18, and 20. The outputs of the respective mixers will then contain the sum and difference frequencies of each of the RF amplifier signal frequencies taken in combination with the local oscillator frequency D.

The signal components appearing at the output of mixer 40 are shown embraced by the bracket 50 and include the sums and differences of the local oscillator D with the RF frequency A and, of course, the individual frequencies themselves A and D. The outputs of mixers 42 and 44 are similarly indicated by the brackets at 52 and 54 respectively.

The novel distribution system of the present invention is now realized by means of a waveguide 56 which may represent a ventilating air duct, a heating air duct, an airconditioning or cooling air duct or any other form of electrically conductive tubular structure. As is well-known in the art to which this invention pertains, most any form of tubular structure made of electrically conductive material may be made to act as a waveguide or, in other words, propagate electromagnetic energy. Furthermore, for any given waveguide of fixed dimensions, there are known to be a number of possible propagational modes which may be established by proper orientation of the input probes to the waveguide or by suitable choice of the signal frequency to be propagated for a given probe orientation.

There is also for any given waveguide and for any given mode of propagation therein, a cutoff frequency. Frequencies higher than this cutoff frequency are normally thought of as being propagated by the waveguide whereas frequencies below this cut-off frequency are effectively not propagated by the waveguide and thus highly attenuated. Further details relative to modes of waveguide propagation and associated cut-off frequencies may be obtained from a publication entitled "Ultra-High-Frequency Techniques" by Brainard, Koehler Reich and Woodruff, published in 1942 by D. Van Nostrand Co., Inc.

In the practice of the present invention, the local oscillator frequency D produced by the local oscillator 48 is selected so that it is above the cut-off frequency of the selected mode of propagation in the waveguide 56. Thus, the frequency D will be readily communicated by the wave guide. The outputs of mixers 40, 42, and 44 are respectively connected to the input probes 58, 60, and 62 these probes being properly oriented in accordance with the particular mode of excitation selected. Three separate probes have been shown solely for illustrative simplicity and it is understood that in practice one probe could be used with equal satisfaction just as the individual mixers 40, 42, and 44 may be combined into a single mixer circuit adapted to handle and mix four separate input signals.

Depending, now, upon the extent to which frequency D is above the cut-off frequency of the waveguide 56, the waveguide may or may not communicate the difference frequencies D−A, D−B, and D−C but will in any event be communicative of the sum frequencies D+A, D+B, and D+C as well as the hereinbefore described local oscillator frequency D. Whether or not local oscillator frequency D is selected sufficiently above the modal cut-off frequency of the waveguide to allow passage of the difference frequencies will hereinafter be seen to be of little importance in the understanding of the system and for ease in description, it will be assumed that these difference frequencies are not communicated. Correspondingly, the waveguide will then propagate signals corresponding only to D+A, D+B, and D+C.

Assuming now that there are provided a number of radio receivers such as 64, 66, and 68 adapted to receive the frequencies A, B, and C but not responsive to the super high frequencies communicated by the waveguide, effective distribution of the signals intercepted by the antennae 22, 24, and 26 may be made by inserting probes such as 70, 72, and 74 at various points along with waveguide 56. As before stated, the receivers are responsive only to frequencies in the range of A, B, and C so that some means must be provided for transducing the super high frequencies carrier by the waveguide to lower frequencies suitable for use by the receivers. Therefore, associated with each receiver is a non-linear device such as shown at 76, 78 and 80. These non-linear devices may be of any nature, passive or active, and in some practices of the present invention may be no more than a simple diode of the germanium variety. The desirable action of the non-linear device to produce suitable signal frequencies for use by the receivers can be understood by considering probe 70 in connection with the non-linear device 76.

Probe 70 will intercept the frequencies D, D+A, D+B, and D+C and apply them concomittantly for non-linear communication by the device 76. For ease in illustration, the frequency D+A, representing the super high frequency version of channel or frequency A, will be the only propagated component considered and is indicated by the bracket 82. The output of the non-linear device indicated by the bracket 84 will then mainly comprise the sum and difference frequencies of D and D+A, namely, D+A, 2D+A, A and D. The receiver 64 will be seen to be supplied in this instance with the required operating frequency A, by the difference combination of D and D+A. Other transformations of the signals detected by probe 72 and 74, these signals being represented respectively by brackets 86 and 88 follow in a similar fashion. The outputs of the non-linear device 78 and 80 shown by brackets 90 and 92 may be seen to contain the RF frequencies B and C to which receivers 66 and 68 are taken to be responsive. Manifestly, any of the receivers shown, for example 66, may be adapted to selectively operate on any of the RF signal frequencies and, of course, the output of the non-linear device 78 would contain the required operating frequency.

Figure 2:
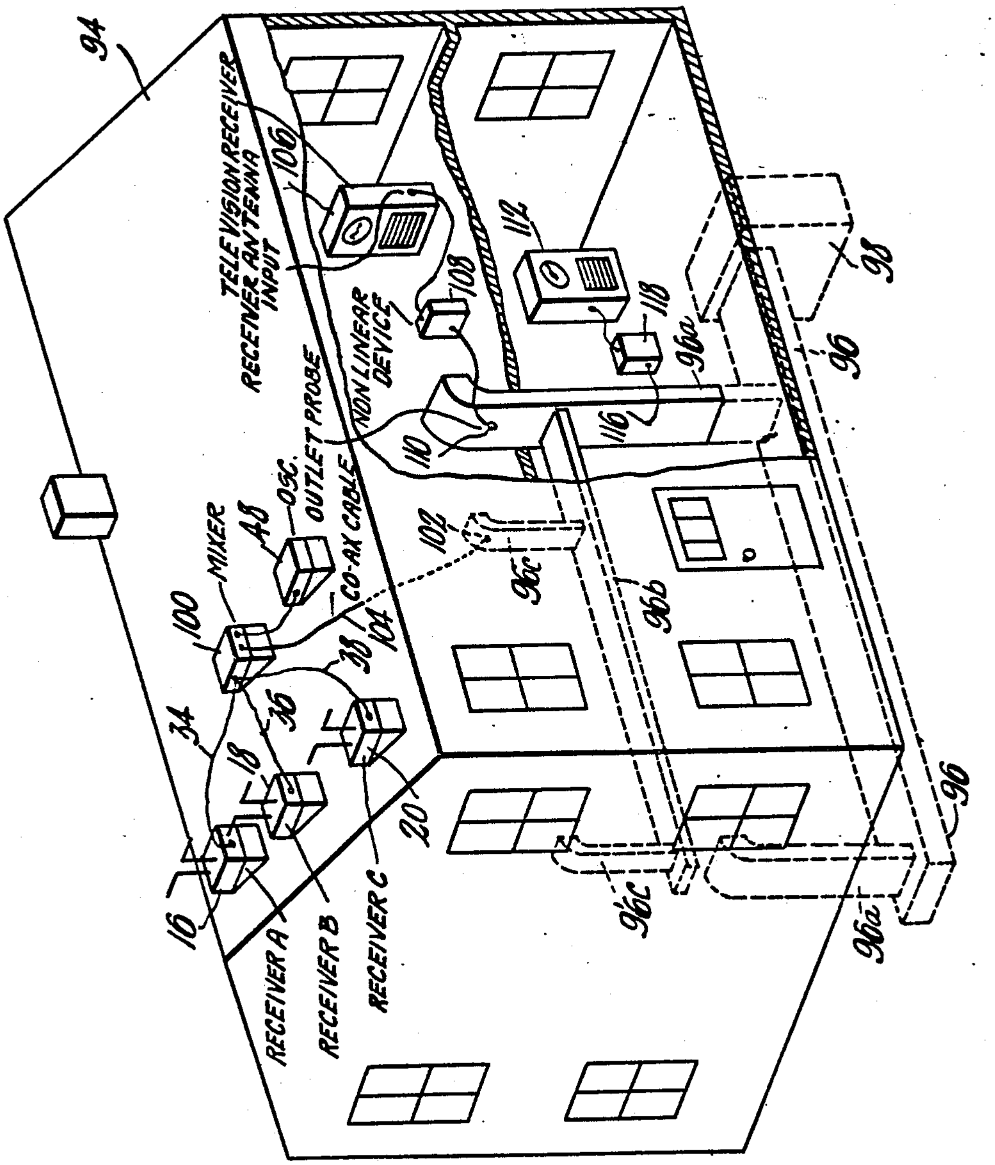
Figure 2 is a pictorial representation of a typical embodiment of the present invention in one of its forms to an architectural structure having a central air duct system.

Turning now to Figure 2, the distribution system set forth by the present invention is shown applied to a dwelling 94. The dwelling 94 is provided with an air duct system 96 having a central air distribution pump 98. It is seen that in some instances the duct system 96 may be comprised of a variety of different sized ducts, such as illustrated by the main duct 96, the auxiliary duct size 96*a*, a yet smaller duct size 96*b*, and a still further smaller duct size 96*c*. The amplifiers 16, 18 and 20 with antennae are shown as situated on the roof of the dwelling having their respective outputs 34, 46, and 38 applied this case to a common mixer 100. Local oscillator 48 is also applied to the mixer 100 in accordance with the arrangement of Fig. 1. The output of the mixer 100 is then applied to a signal input probe 102 in the duct 96*c*. In practice, the mixer 100 and the oscillator 48 would be more closely associated with the duct 96*c* to eliminate the need for the co-axial cable 104, the showing in Fig. 2 merely being exemplary for ease in description.

In the arrangement in Fig. 2, it will be seen that the frequency of oscillator 48 will depend upon the smallest dimensioned duct in the system such as represented in the drawing by the duct size 96*c*. Accordingly, the oscillator will be in excess of this cut-off frequency so that it will be necessarily communicated by the other larger sized ducts 96, 96*a*, and 96*b* to other locations in the dwelling 94. As an example of the utilization of the energy propagated by the duct, a television receiver 106 is shown connected with a non-linear device 108, the input of which device is supplied with energy detected by an output probe 110 extending into the duct 96*a*. Correspondingly, at another location in the building another television receiver, such as 112, could be connected with another outlet probe such as 116 through another non-linear device, such as 118. It is apparent in practice that the non-linear devices such as 108 and 118 may be made to fully isolate the television receivers 106 and 112 from one another and that there is virtually no limit to the number of television receivers that could be operated from the duct system with such an arrangement.

It will, of course, be appreciated by those familiar with electromagnetic wave propagation techniques that a tubing system designed for conduction of air within a building may have certain constructional features which would produce discontinuities in electromagnetic wave conduction. If such discontinuities exist and unwanted reflections occur due to improper impedance matching between various sections of the duct systems, multiple ghost images would be produced in the reception and reproduction of television signals. These reflections may then be eliminated by inserting resistive pads of discrete value at suitable positions in the system and the effects of such reflections may be further reduced by supplying reflectors adjacent the pick up probes to confine pick up to substantially one propagational direction. Such expediences are well known in the art and are described at great length in the Massachusetts Institute of Technology "Radiation Laboratories" Technical series.

It is clear that although the present system has been described as being particularly useful as a television antenna distribution system, it will find application to many other forms of radio signal receiving systems wherein it is desired to reduce the number of individual antennae needed in a given dwelling for operation of a plurality of signal utilization devices.

What is claimed is:

1. In a radio communication system having a plurality of radio transmitters each operating on a different transmission frequency, the combination of, a plurality of radio frequency wave communicatory devices each adapted to communicate transmitted energy directed from a respective radio transmitter, a source of radio frequency signal having a substantially constant but predetermined frequency, means for non-linearly combining the output of all radio frequency communicatory devices with one another together with the radio frequency signal of predetermined frequency, a passive wave translating device connected with the output of said last-named means for translating as a composite signal the signal derived from said radio frequency source as well as a portion of the combined signal produced by said last named means, said portion being exclusive of any transmitter transmission frequencies, a plurality of means each adapted to extract from said wave translating device an electrical version of the composite signal communicated by said translating device, a plurality of non-linear signal communicatory means each respectively connected with the output signal of at least one extracting means, such to provide at the output of each of said non-linear signal communicatory means signal energy corresponding in frequency to at least one of the different transmission frequencies.

2. In a radio communication system having a plurality of radio transmitters each operating on a different transmission frequency, the combination of, at least one radio frequency wave communicatory device adapted to communicate transmitted energy directed from one of the system radio transmitters, a source of radio frequency signal having a substantially constant but predetermined frequency, means for non-linearly combining the output of said radio frequency communicatory device with the radio frequency signal of predetermined frequency, a passive wave translating device connected with the output of said last-named means for translating as a composite signal both the signal derived from said radio frequency source as well as a portion of the combined signal produced by said non-linear combining means, said portion being exclusive of any transmitter transmission frequencies, means adapted to extract from said wave translating device an electrical version of the composite signal communicated by said translating device, a non-linear signal communicatory means connected with the output of said extracting means, such to provide at the output of said non-linear signal communicatory means signal energy corresponding in frequency to the transmission frequency of the transmitter from which energy is communicated.

3. In a radio communication system having a plurality of radio transmitters each operating on a different transmission frequency, the combination of, a plurality of radio frequency amplifiers each adapted to amplify transmitted energy directed from a respective radio transmitter, a source of radio frequency signal having a substantially constant but predetermined frequency, means for non-linearly combining the output of all radio frequency amplifiers with one another together with the radio frequency signal of predetermined frequency, a linear passive wave communicatory device connected with the output of said last-named means for communicating as a compound signal both the signal derived from said radio frequency source and a portion of the combined signal produced by said non-linear combining means, said portion being exclusive of any transmitter transmission frequency, a plurality of means each adapted to extract from said wave communicatory device an electrical version of the composite signal communicated by said communicatory device, a plurality of passive non-linear signal communicatory means each connected with the output signal of at least one extracting means, such to provide at the output of each of said non-linear signal communicatory means signal energy corresponding in frequency to at least one of the different transmission frequencies.

4. In a radio communication system having a plurality of radio transmitters each operating on a different transmission frequency, the combination of, a plurality of radio frequency amplifiers each adapted to amplify transmitted energy directed from a respective radio transmitter, a source of radio frequency signal having a substantially constant but predetermined frequency, means for non-linearly combining the output of all radio frequency amplifiers with one another together with the radio frequency signal of predetermined frequency, a passive wave communicatory device connected with the output of said last-named means for communicating as a composite signal both the signal derived from said radio frequency source and a portion of the combined signal produced by said non-linear combining means, said portion being exclusive of any transmitter transmission frequencies, a plurality of means each adapted to extract energy from said wave communicatory device and produce an output signal which is an electrical version of the composite signal communicated by said communicatory device, a plurality of non-linear signal communicatory means each having an input and an output, the input of each being connected with the output signal of at least one extracting means such that there is provided at the output of each of said non-linear signal communicatory means signal energy corresponding in frequency to at least one of the different transmitter transmission frequencies, and a radio receiver having an input terminal connected with the output of one of said non-linear signal communicatory means, said receiver being adapted to respond to at least one of the so produced transmitter transmission frequencies.

5. In a radio communication system having a plurality of remote radio transmitters, each operating on a different transmission frequency, the combination of: a plurality of radio frequency amplifiers, each adapted to amplify transmitted energy directed from a respective remote radio transmitter, a local source of radio frequency signal having a predetermined and substantially constant frequency of a value considerably in excess of the highest radio transmitter operating frequency, a non-linear combining means connected with said amplifiers and said local source of radio frequency signal for non-linearly combining the output of all radio frequency amplifiers with one another together with the radio frequency signal from said local radio frequency source, a frequency selective wave communicatory instrumentality connected with the output of said combining means for communicating as a composite signal both signal frequencies therefrom corresponding to said local radio frequency source, and signal frequencies representing the respective sums of said local radio frequency source signal with each of the different transmission frequencies, a plurality of means each for extracting energy from said wave communicatory instrumentality and develop an output signal which is an electrical version of the composite signal communicated thereby, and a plurality of non-linear signal communicating means each respectively connected with the output signal of at least one extracting means, such to provide at the output of each of said non-linear signal communicatory means signal energy corresponding in frequency to at least one of the different transmission frequencies.

6. In a radio communication system having a plurality of remote radio transmitters, each operating on a different transmission frequency, the combination of: a plurality of radio frequency amplifiers, each adapted to amplify transmitted energy directed from a respective remote radio transmitter, a local source of high frequency heterodyning signal having a predetermined and substantially constant frequency of a value considerably in excess of the highest radio transmitter operating frequency, a non-linear combining means connected with said amplifiers and said local source of heterodyning signal for non-linearly combining the output of all radio frequency amplifiers with one another together with the heterodyning signal from said local source, a frequency selective linear passive wave communicatory instrumentality connected with the output of said combining means for communicating as a composite signal both signal frequencies therefrom corresponding to said local heterodyning source, and signal frequencies representing the respective sums of said local heterodyning source signal with each of the different transmission frequencies, a plurality of means each for extracting energy from said wave communicatory device and develop an output voltage which is an electrical version of the composite signal communicated thereby, and a plurality of passive non-linear signal communicatory means each connected with the output signal of at least one extracting means, such to provide at the output of each of said non-linear signal communicatory means signal energy corresponding in frequency to at least one of the different transmission frequencies.

7. In a radio communication system having a plurality of remote radio transmitters, each operating on a different transmission frequency, the combination of: a plurality of radio frequency amplifiers, each adapted to amplify transmitted energy directed from a respective remote radio transmitter, a local source of radio frequency signal having a predetermined and substantially constant frequency of a value considerably in excess of the highest radio transmitter operating frequency, a non-linear combining means connected with said amplifiers and said local source of signal for non-linearly combining the output of all radio frequency amplifiers with one another together with the signal from said local radio frequency source, a frequency selective linear passive wave communicatory instrumentality connected with the output of said combining means for communicating as a composite signal both signal frequencies therefrom corresponding to said local source and signal frequencies therefrom representing the respective sums of said local radio frequency source signal with each of the different transmission frequencies, a plurality of means each responsive to energy communicated within said wave communicatory device to develop an output signal which is an electrical version of the composite signal communicated thereby, a plurality of passive non-linear signal communicatory means each connected with the output signal of at least one energy responsive means, such to provide at the output of each of said non-linear signal communicatory means signal energy corresponding in frequency to at least one of the different transmission frequencies, and a radio receiver having an input terminal connected with the output of said non-linear signal communicatory means adapted to respond to at least one of the so reproduced transmitter transmission frequencies.

8. In a radio communication system having a plurality of remote radio transmitters, each operating on a different transmission frequency, the combination of: at least one radio frequency amplifier adapted to amplify transmitted energy directed from a respective remote radio transmitter, a local source of radio frequency signal having a predetermined and substantially constant frequency of a value considerably in excess of the amplified radio transmitter energy frequency, a non-linear combining means connected with said amplifier and said local source of signal for non-linearly combining the output of the radio frequency amplifier with the signal from said local radio frequency source, a frequency selective linear passive wave communicatory instrumentality connected with the output of said combining means for communicating as a composite signal both signal frequencies therefrom corresponding to said local source and signal frequencies therefrom representing the sum of said local radio frequency source signal with the amplified transmission frequency, at least one means responsive to energy communicated within said wave communicatory device to develop an output signal which is an electrical version of the composite signal communicated thereby, at least one passive non-linear signal communicatory means connected with the output signal of said energy responsive means, such to provide at the output of each of said non-linear signal communicatory means signal energy corresponding in frequency to the amplified transmission frequency, and a radio receiver having an input terminal connected with the output of said non-linear signal communicatory means adapted to respond to the so reproduced transmitter transmission frequency.

9. In an architectural building having a system of continuous tubing communicating between various locations within the building, said tubing system being suitable for wave guide propagation of electromagnetic energy in accordance with a given propagational mode, such energy necessarily having frequencies in excess of the given modal cut-off frequency defined by the linear dimensions of the tubing utilized in the system, the method of utilizing said tubing system for radio frequency energy distribution comprising the following steps: deriving a plurality of radio frequency signals each representing independent signal intelligence, and each having a signal frequency below that of the tubing system cut-off frequency, generating a substantially constant super-high radio frequency signal having a frequency value in excess of the tubing system cut-off frequency, non-linearly mixing the super-high radio frequency with the plurality of radio frequency intelligence signals, applying the mixed signals to said tubing system for wave guide propagation thereof in accordance with the given mode of propagation, detecting the propagated signals in the tubing system at various locations within the building, non-linearly translating the signals so detected to produce a plurality of signals each representing in frequency and in amplitude variation the radio frequency intelligence signals, and utilizing these signals for operating a radio receiving equipment responsive to signal frequencies corresponding to the radio frequency intelligence signals.

10. In an architectural building having a system of continuous tubing communicating between various locations within the building, said tubing system being suitable for wave guide propagation of electromagnetic energy in accordance with a given propagational mode, such energy necessarily having frequencies in excess of the given modal cut-off frequency defined by the linear dimensions of the tubing utilized in the system, the method of utilizing said tubing system for radio frequency energy distribution comprising the following steps: deriving a radio frequency signal representing signal intelligence, and having a signal frequency below that of the tubing system cut-off frequency, generating a substantially constant super-high radio frequency signal having a frequency value in excess of the tubing system cut-off frequency, non-linearly mixing the super-high radio frequency with the radio frequency intelligence signal, applying the mixed signals to said tubing system for wave guide propagation thereof in accordance with the given mode of propagation, detecting the propagated signals in the tubing system at various locations within the building, non-linearly translating the signals so detected to produce a signal representing in frequency and in amplitude variation the radio frequency intelligence signal, and utilizing this signal for operating a radio receiving equipment responsive to signal frequencies corresponding to the radio frequency intelligence signal.

11. In an architectural building having a system of continuous tubing communicating between various locations within the building, said tubing system being suitable for wave guide propagation of electromagnetic energy in accordance with the given mode of propagation provided said electromagnetic energy is of a frequency in excess of the given modal cut-off frequency defined by the linear dimensions of the tubing utilized in the system, a radio frequency energy distribution system comprising in combination: a plurality of radio frequency signal sources, the signal from each source representing independent signal intelligence and each signal having a signal frequency below that of the tubing system modal cut-off frequency, a signal generator for developing a heterodyning signal having a substantially constant super-high radio frequency in excess of the tubing system cut-off frequency, means for non-linearly mixing the heterodyning signal with signals from each of said plurality of radio signal sources to produce a plurality of super-high frequency radio signals representing the individual sums and differences of each of the radio signals with the heterodyning signal, means for presenting the heterodyning signal and the plurality of super-high frequency radio signals to said tubing system for wave guide propagation thereof according to the given mode therein, a plurality of means for detecting the propagated signals in the tubing system at various locations within the building, a plurality of means each respectively associated with one of said last-named means for non-linearly combining the signals detected to produce a plurality of signals each representing the difference between a propagated heterodyning frequency and the respective individual propagated super-high frequency radio signals.

12. In an architectural building having a system of continuous tubing communicating between various locations within the building, said tubing system being suitable for wave guide propagation of electromagnetic energy in accordance with the given mode of propagation provided the electromagnetic energy is of a frequency in excess of the given modal cut-off frequency defined by the linear dimensions of the tubing utilized in the system, a radio frequency energy distribution system comprising in combination: a plurality of radio frequency signal sources, the signals from each of said sources representing independent signal intelligence and each signal having a signal frequency below that of the tubing system modal cut-off frequency, a signal generator for developing a heterodyning signal having a substantially constant super-high radio frequency in excess of the tubing system cut-off, means for non-linearly mixing the heterodyning signal with signals from each of said plurality of radio signal sources to produce a plurality of super-high frequency radio signals representing the individual sums and differences of each of the radio signals with the heterodyning signal, means for presenting the heterodyning signal with the plurality of super high frequency radio signals to the tubing system for wave guide propagation thereof according to the given mode therein, a plurality of means for detecting the propagated signals in the tubing system at various locations within the building, a plurality of means each respectively associated with a different one of said detecting means for non-linearly combining the signals detected to produce a plurality of signals each representing the difference between the propagated heterodyning frequency and an individual propagated super-high frequency radio signal, and a radio signal receiver connected with at least one of said non-linear combining means for response to propagated energy corresponding to the signals from said radio frequency signal sources.

13. In an architectural building having a system of continuous tubing communicating between various locations within the building, said tubing system being suitable for wave guide propagation of electromagnetic energy in accordance with the given mode of propagation provided the electromagnetic energy is of a frequency in excess of the given modal cut-off frequency defined by the linear dimensions of the tubing utilized in the system, a radio frequency energy distribution system comprising in combination, a plurality of radio frequency signal sources, the signal from each of said sources representing independent signal intelligence and each signal having a signal frequency below that of the tubing system modal cut-off frequency, a signal generator for developing a heterodyning signal having a substantially constant super-high radio frequency in excess of the tubing system cut-off frequency, means for non-linearly mixing the heterodyning signal with signals from each of said plurality of radio signal sources to produce a plurality of super-high radio intelligence signals each respectively representing a particular intelligence as conveyed by a corresponding radio frequency signal, means for presenting the plurality of super-high radio intelligence signals and heterodyning signal to the tubing system for wave propagation thereof, a plurality of means for detecting the propagated signals in the tubing system at various locations within the building, and a plurality of means each respectively associated with a different one of said detecting means for non-linearly translating the signals detected thereby to produce a plurality of heterodyne signals conveying the same signal intelligence as the radio signals delivered by said radio signal sources.

14. In an architectural building having a system of continuous tubing communicating between various locations within the building, said tubing system being suitable for wave guide propagation of electromagnetic energy in accordance with a given mode of propagation provided said electromagnetic energy is of a frequency in excess of the given modal cut-off frequency defined by the linear dimensions of the tubing utilized in the system, a radio frequency energy distribution system comprising in combination, a plurality of radio frequency signal sources, the signal for such sources representing independent signal intelligence, each having a signal frequency below that of the tubing system modal cut-off frequency, a signal generator for developing a heterodyning signal having a substantially constant super-high radio frequency in excess of the tubing system cut-off frequency, means for non-linearly mixing the heterodyning signals with signals from each of said plurality of radio signal sources to produce a plurality of super-high heterodyne radio signals each respectively representing a particular intelligence as conveyed by a corresponding radio frequency signal, means for presenting the plurality of super high radio intelligence signals and heterodyning signal to the tubing system for wave propagation thereof, a plurality of means for detecting the propagated signals in the tubing system at various locations within the building, and a plurality of means each respectively associated with a different one of said detecting means for non-linearly translating the signals detected thereby to produce a plurality of heterodyne signals conveying the same signal intelligence as the radio signals delivered by said radio sources, and a radio signal receiver connected with at least one of said non-linear translating means for response

SEARCH ROOM to energy corresponding in frequency to the signals from said radio frequency signal sources.

15. Apparatus according to claim 14 wherein said tubing system is adapted to communicate a current of air for air distribution purposes and wherein said signal sources are antennae, each operating on a different radio carrier frequency and wherein said detecting means comprises a series of electromagnetic probes modally positioned within the tubing system for response to the electromagnetic waves propagated by said tubing system.

16. In an architectural building having an air distribution system utilizing a network of connected air ducts communicating between various locations within the building, the air ducts being of suitable material and dimensions to permit their use for wave guide propagation, according to a given mode, of only those signals having frequencies in excess of the given modal cut-off frequency, said cut-off frequency being defined by the smallest dimensioned duct to be used for wave guide propagation in the system, a radio signal distribution system comprising in combination, at least one source of radio frequency signal carrier having a frequency below that of the duct system modal cut-off frequency, a source of heterodyning signal having substantially constant super high radio frequency of a value in excess of the duct system cut-off frequency, at least one electronic mixing circuit having non-linear characteristics and adapted for mixing at least two electrical signals, said mixing circuit having an input terminal and an output terminal, connections between said source of radio frequency signal, said source of heterodyning signal and the mixing circuit input terminals, an input device situated for electromagnetic excitation of the duct system according to the given propagation mode, connections between the mixing circuit output terminal and said input device, at least two electromagnetic wave sampling devices located in said duct system at points remote from said input device, each of said sampling devices being adapted to develop an electrical signal in accordance with the frequency and amplitude of the waves propagated by the duct system, a respective non-linear signal communicatory device for each of wave sampling devices, each non-linear signal communicatory device having an input terminal and an output terminal, and means for applying the electrical signal developed by each of said sampling devices to respective input terminal of a corresponding non-linear communicatory device.

17. In an architectural building having an air distribution system utilizing a network of connected air ducts communicating between various locations within the building, the air ducts being of suitable material and dimensions to permit their use for wave guide propagation, according to a given mode of only those signals having frequencies in excess of the given modal cut-off frequency, said cut-off frequency being defined by the smallest dimensioned duct to be used for wave guide propagation in the system, a radio signal distribution system comprising in combination, at least one source of radio frequency signal carrier having a frequency below that of the duct system modal cut-off frequency, a source of heterodyning signal having substantially constant super high radio frequency of a value in excess of the duct system cut-off frequency, at least one electronic mixing circuit having non-linear characteristics and adapted for mixing at least two electrical signals, said mixing circuit having an input terminal and an output terminal, connections between said source of radio frequency signal, said source of heterodyning signal and the mixing circuit input terminals, an input device situated for electromagnetic excitation of the duct system according to the given propagation mode, connections between the mixing circuit output terminal and said input device, at least two electromagnetic wave sampling devices located in said duct system at points remote from said input device, each of said sampling devices being adapted to develop an electrical signal in accordance with the frequency and amplitude of the waves propagated by the duct system, a respective non-linear signal communicatory device for each of said wave sampling devices, each non-linear signal communicatory device having an input terminal and an output terminal, means for applying the electrical signal developed by each of said sampling devices to respective input terminal of corresponding non-linear communicatory device, and a radio signal receiver connected with the output of said non-linear communicatory device for response to the signals produced by said radio frequencies signal source.

WILLIAM HOTINE.

REFERENCES CITED

The following references are of record in the file of this patent:

UNITED STATES PATENTS

| Number | Name | Date |
|---|---|---|
| 1,840,013 | Benson | Jan. 5, 1932 |
| 1,989,466 | Satterlee et al. | Jan. 29, 1935 |
| 2,459,485 | Bartlett | Jan. 18, 1949 |